J. W. STICKLEY.
METALLIC ROD PACKING.
APPLICATION FILED SEPT. 11, 1912.
1,050,870.
Patented Jan. 21, 1913.
2 SHEETS—SHEET 1.
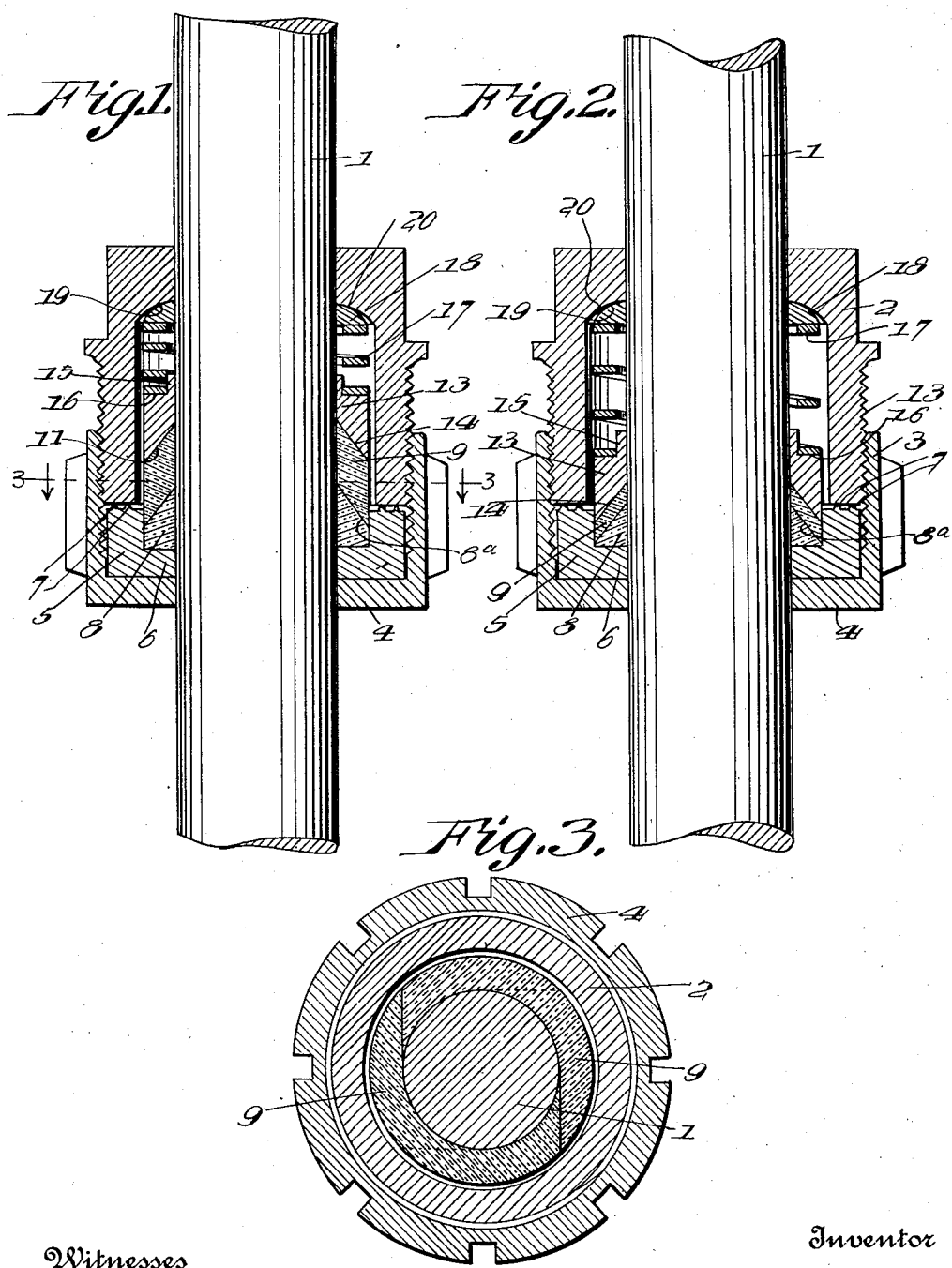
Witnesses
E. D. B. Brown.
Inventor
Joseph W. Stickley,
By E. H. Bond
Attorney J. W. STICKLEY.
METALLIC ROD PACKING.
APPLICATION FILED SEPT. 11, 1912.
1,050,870.
Patented Jan. 21, 1913.
2 SHEETS—SHEET 2.
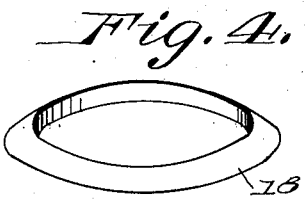
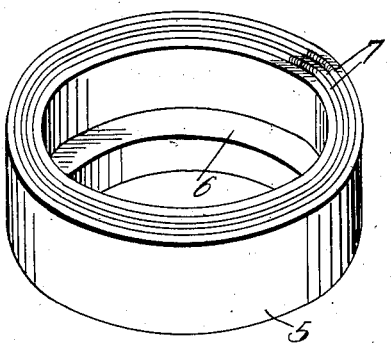
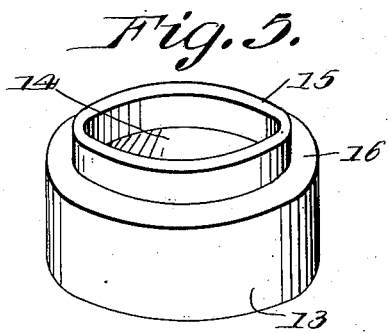
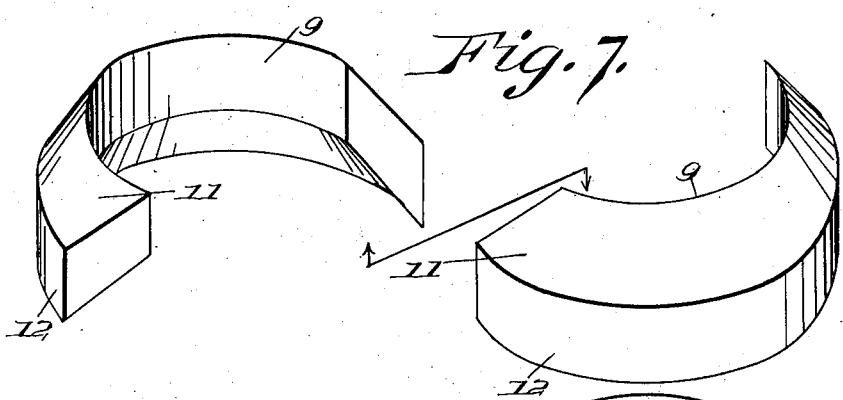
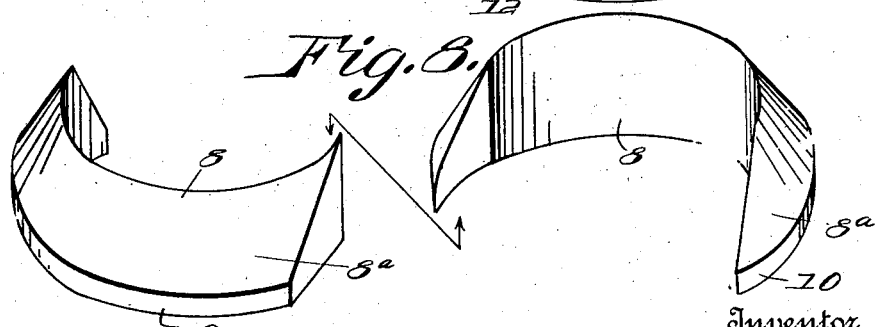
Witnesses
E. D. V. B. Brown.
Geo. H. Snyder
Inventor
Joseph W. Stickley,
By E. H. Bond
Attorney

UNITED STATES PATENT OFFICE.

JOSEPH W. STICKLEY, OF NORFOLK, VIRGINIA.

METALLIC ROD-PACKING.

1,050,870.

Specification of Letters Patent.

Patented Jan. 21, 1913.

Application filed September 11, 1912. Serial No. 719,824.

*To all whom it may concern:*

Be it known that I, JOSEPH W. STICKLEY, a citizen of the United States of America, and resident of Norfolk, in the county of Norfolk and State of Virginia, have invented certain new and useful Improvements in Metallic Rod-Packing, of which the following is a specification.

This invention relates to certain new and useful improvements in metallic rod packing of that class designed for use in connection with any reciprocating or rotating rod or shaft and of the type generally known as self-adjusting.

The present invention has for its objects among others to provide a simplified and improved form of packing of this general character which shall be long-lived, readily applied and applicable to any of the well-known forms of cylinder heads or stuffing-boxes and with the parts so constructed and arranged that a perfectly tight joint is assured even to the wearing out of the packing rings. I provide against lateral expansion or displacement of the packing rings as well as an additional safe-guard against leakage, the rings being confined within a retaining cup into which also the follower is receivable, said follower serving, when the packing rings become worn, as a packing member. The retaining cup is provided with a plurality of annular ribs which have direct contact with the adjacent end of the stuffing-box member to serve as additional preventive against leakage. I employ packing rings with conical portions, said rings being received one within the other and arranged with their apices facing the end of the stuffing-box against which the ring finds an abutment, instead of toward the inner end as has heretofore been the custom, so that the pressures of the steam and spring are exerted against the apices of the packing rings.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a longitudinal section through a stuffing-box with my improvements applied thereto, the shaft or rod being shown in elevation. Fig. 2 is a similar view showing the position of the parts after the packing rings have become worn. Fig. 3 is a cross section on the line 3—3 of Fig. 1, looking in the direction of the arrows. Fig. 4 is a perspective detail of the back ring which forms an abutment for the spring. Fig. 5 is a perspective view of the follower. Fig. 6 is a perspective view of the retaining cup. Fig. 7 is a perspective view of one of the sectional soft metal packing rings. Fig. 8 is a similar view of the other soft metal packing ring.

Like numerals of reference indicate like parts throughout the several views.

Referring to the drawings, 1 designates a rod or shaft, for instance a piston rod of a pump or engine, to which in the present instance it has been deemed advisable to show my improved packing as applied. 2 is the stuffing-box having adjustable connection with the flange 3 of the cap 4 in the usual manner, these parts being of ordinary and well-known construction needing no further specific description and to which no claim *per se* is herein made.

5 is a retaining cup, the horizontal portion 6 of which has an opening for the passage of the shaft or rod 1 and, as seen in Figs. 1 and 2, the upper or inner face of the annular flange portion of this cup is provided with the annular ribs or projections 7, seen clearly in Figs. 1, 2 and 6. The inner end wall of the stuffing-box 2 bears directly against these annular ribs or projections, as seen in Figs. 1 and 2, and when screwed up tight, the parts being of brass or similar metal, the ribs will be forced into close contact with the adjacent face of the stuffing-box and a steam and air-tight joint thus provided.

The packing rings which I employ are of some soft metal packing material, such as Babbitt metal or the like. They are formed in sections so as to allow them to readily adapt themselves to the shape of the shaft or rod and to hug tightly a rod or shaft that has become worn and is not perfectly cylindrical in shape. One of these rings is seen at 8 in Fig. 8. It is composed of two halves and when these two halves are placed in proper relation to form a ring, the latter is in the form of a cone, the outer tapered wall 8ª of which is preferably at an angle of 55° which I have found by experience to be the most efficient, although it is evident that the invention is not restricted to this precise angle. The taper of this ring 8 extends substantially to the outer edge, although preferably leaving a comparatively small peripheral face 10 which is parallel with the shaft or rod to which the ring is applied. In Fig. 7 I show the other ring 9 which is likewise in two parts and the meeting or adjacent faces, which are designed to overlap, are upon an incline, as shown in Figs. 7 and 8, so as to allow of the automatic adjustment or positioning of the parts so as to fit snugly around the shaft or rod 1. This ring has a tapered or conical outer face 11 with a vertical portion 12 of greater height than the vertical portion 10 of the ring 8. In practice, these rings are placed within the retaining cup 5, the annular flange portion of which is of sufficient depth to receive a portion of the vertical face 12 of the upper ring, as seen clearly in Fig. 1. These rings are placed with their joints so as to break joints, as indicated in full and dotted lines in Fig. 3, it being noted that the one ring is received within the other, as shown clearly in Fig. 1, and then the follower 13 is applied. This follower has its inner face tapered at an angle of 55°, as seen at 14 in Fig. 1, so as to match the taper of the ring 9. This follower has an annular flange 15 forming a shoulder 16, as seen in Figs. 1, 2 and 5, the flange portion 15 receiving the end of a spring 17 which has a bearing against the shoulder 16; the other end of the spring bearing against a back ring 18, the outer face of which is rounded, as seen at 19, and received in a correspondingly concaved socket or portion 20 in the outer end of the stuffing-box. This allows of the requisite rocking movement to compensate for any variation in the movement of the piston rod or shaft.

In practice, the parts are assembled by placing the retaining cup within the member 4 and then placing the rings 8 and 9 within the cup, the outer peripheral faces 10 and 12 of said rings being received within the flange portion of the cup so as to be held against outward compression and then the follower 13 is placed upon the adjacent ring, the spring applied and the back ring 18 placed in position and then the stuffing-box 2 screwed in until the parts are properly compressed and the inner face of the stuffing-box bears tightly against the annular ribs or projections 7 of the retaining cup. By this means, the pressure of the steam and spring being toward the retaining cup, the packing rings are forced inward against the piston rod or shaft 1 and as the rings become worn, they are still forced against the rod or shaft. Even when the packing rings become so worn that the follower 13 enters the retaining cup, the rings are still forced tightly against the rod or shaft. Fig. 2 indicates the position of the parts when the packing rings 8 and 9 have become considerably worn and in this view it will be seen that the follower has its lower edge received within the flange of the retaining cup and said follower will be forced in close contact with the rod or shaft and this will be the case even when the packing rings have been practically worn away to nothing. It will thus be seen that I utilize the force of the steam or air and the spring to constantly force the packing rings against the piston rod or shaft and that the tendency is always to force them in, the rings being retained against outward movement and as soon as the tapered end of the follower enters the space within the flange of the retaining cup, it tends to more firmly compress the packing rings against the piston rod or shaft. When the packing rings become practically worn out, the follower, together with the tight joint formed by the annular ribs or projections 7 of the retaining cup bearing firmly against the end wall of the stuffing-box, serves to completely prevent leakage. The parts can be readily renewed or replaced and automatically adjust themselves in position.

From the foregoing, it will be seen that I have devised a simple, efficient and novel form of rod packing and while the structural embodiment of the invention as herein disclosed is what I at the present time consider preferable, it is evident that the same is subject to changes, variations and modifications in detail, proportion of parts, etc., without departing from the spirit of the invention or sacrificing any of its advantages. I, therefore, do not wish to restrict myself to the particular construction hereinbefore disclosed, but reserve the right to make such changes, variations and modifications as come properly within the scope of the protection prayed.

What is claimed as new is:

1. In metallic rod packing, a retaining cup, conical packing rings therein superimposed one upon the other, a tapered follower receiving the adjacent packing ring, and a spring acting on the follower to force the same against the tapered face of the adjacent ring.

2. In metallic rod packing, a retaining cup, conical rings received therein and held against outward movement thereby, and a follower having a conical portion receiving the adjacent ring and means acting on the follower to force the same toward said cup.

3. In metallic rod packing, a retaining cup, superimposed conical rings held therein against outward movement, and a spring pressed follower having its face adjacent said rings conical and receiving the conical face of the adjacent ring.

4. In metallic rod packing, a retaining cup, conical rings received therein and held against outward movement, a follower having conical portion receiving the adjacent ring, and means forcing said follower against the rings in the direction of the application of the motive agent.

5. In metallic rod packing, a retaining cup, conical rings received therein and held against outward movement, a follower having a conical portion fitted to the adjacent ring, a spring pressing the follower toward the rings, and a stuffing-box member forming a tight joint with the adjacent end of the retaining cup.

6. In metallic rod packing, a retaining cup, conical packing rings retained therein, a follower having a conical portion receiving the adjacent packing ring, a spring acting on the follower, and a stuffing-box member, the retaining cup having annular projections for direct engagement with the end of said stuffing-box member to form a tight joint therewith.

7. In metallic rod packing, sectional conical packing rings, means holding them against outward lateral pressure, a follower acting on the rings to force them inward against the rod, and means forming an airtight joint independent of said rings.

8. In metallic rod packing, superimposed conical sectional packing rings, means holding them against outward lateral movement, and conical means tending to force said rings inward toward the piston rod, said means acting in the direction of the application of the force of the motive agent.

Signed by me at Washington, D. C., this 11th day of Sept., 1912.

JOSEPH W. STICKLEY.

Witnesses:
  THOMAS DURANT,
  E. H. BOND.